Figure 1:
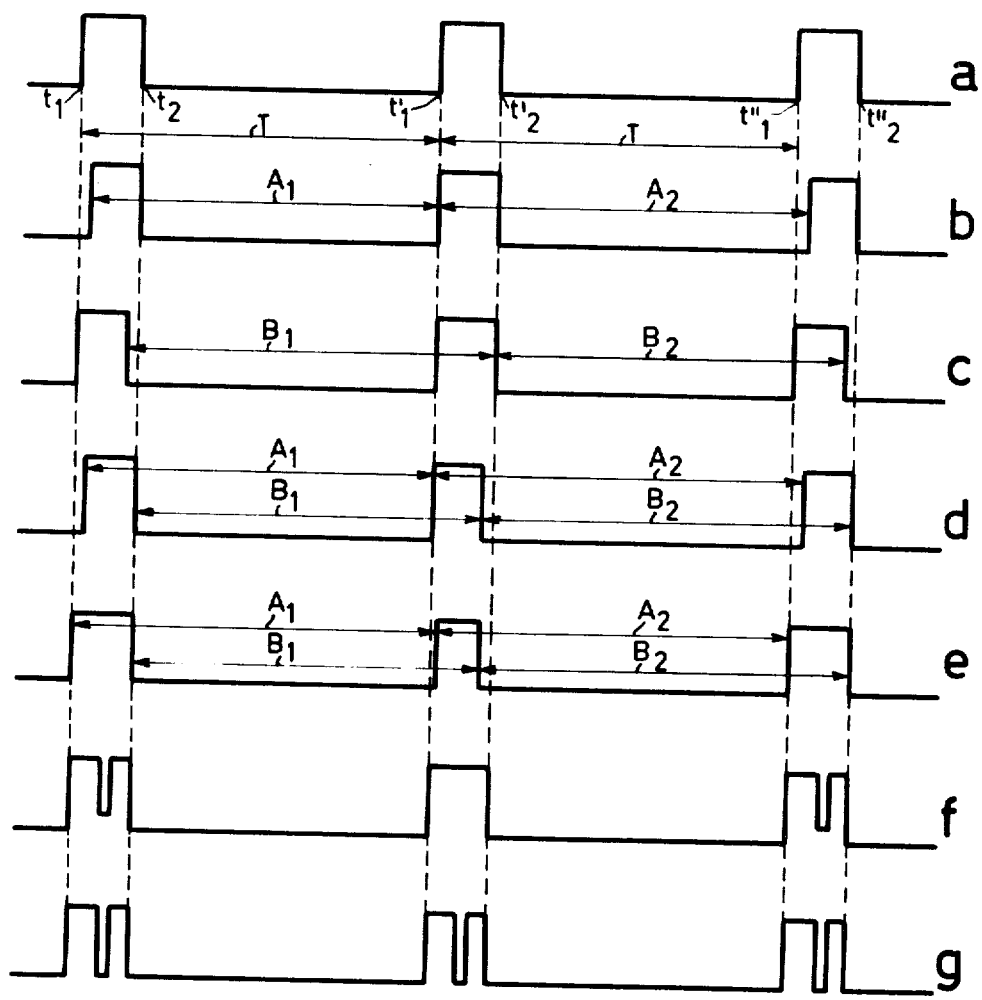

United States Patent [19]

Steinkopf et al.

[11] 4,051,526
[45] Sept. 27, 1977

[54] TELEVISION SYSTEM COMPRISING A VIDEO STORAGE DEVICE AND A TELEVISION RECEIVER

[75] Inventors: Wolfgang Otto Gotthard Steinkopf, Eindhoven, Netherlands; Rudolf Drabek, Vienna, Austria

[73] Assignee: U.S. Philips Corporation, New York, N.Y.

[21] Appl. No.: 592,866

[22] Filed: July 3, 1975

[30] Foreign Application Priority Data

July 15, 1974 Netherlands .................... 7409514

[51] Int. Cl.² .................................. G11B 5/02
[52] U.S. Cl. ................................ 358/127; 360/27; 360/37
[58] Field of Search ............ 360/27, 37; 178/6, 6.8; 325/395; 358/127

[56] References Cited

U.S. PATENT DOCUMENTS

| | | | |
|---|---|---|---|
| 3,532,808 | 10/1970 | Fujisawa | 360/27 |
| 3,588,333 | 6/1971 | De Niet | 360/27 |
| 3,814,844 | 6/1974 | Waldspurger | 360/37 |
| 3,924,190 | 12/1975 | Roach | 325/395 |

*Primary Examiner*—Howard W. Britton
*Assistant Examiner*—Michael A. Masinick
*Attorney, Agent, or Firm*—Frank R. Trifari; Henry I. Steckler

[57] ABSTRACT

A television system comprising a video tape recorder or the like and a television receiver, in which system the television signal contains an identification signal by which it is distinguished from the television signal received from a transmitter. The television receiver includes a circuit arrangement for recognizing the identification signal and for changing over circuits in the receiver, in particular for changing over the time constant network of the flywheel filter of the line synchronizing circuit. The identification signal can encode the line synchronizing pulses, for example by a serration formed therein.

3 Claims, 4 Drawing Figures

TELEVISION SYSTEM COMPRISING A VIDEO STORAGE DEVICE AND A TELEVISION RECEIVER

The invention relates to a television system comprising a video storage device and a television receiver having at least one input terminal for supplying a television signal from a transmitter and from a video storage device.

When a television receiver receives the television signal produced by a video storage device, for example a video tape recorder or a video disc record, difficulties arise, as is known. Because in most cases the device produces the signal with the aid of mechanical means, the frequency of the line synchronizing pulses of the television signal may rapidly vary and deviate from the frequency prescribed by the television standard, which frequency is that of the line synchronizing pulses of the television signal broadcast by the transmitter. In addition a sudden variation may occur between consecutive fields. The said effects are described more fully in the German periodical "Funk-Technik," 1974, No. 3, pages 85 to 87.

One of the steps for eliminating these effects is described in the aforementioned paper and consists in reducing the time constant of the flywheel filter of the line synchronizing circuit in the receiver. It will be clear, however, that this renders synchronization more sensitive to disturbances. Hence, switching the time constant network from one value of the time constant to the other is to be preferred. Besides, the said filter is not the only circuit in the receiver which is to be changed over on reception of a television signal from a video storage device. For example, the line phase discriminator must be capable of handling the abovementioned abrupt variation. If the field synchronizing circuit includes a frequency divider circuit by means of which the double line frequency is divided by the number of lines per frame (for example 625 for the CCIR standard and 525 for the RTMA standard), it may become necessary to have a divisor different from the said number. This is the case when the picture to be displayed is still. Such a change-over is described in U.S. Pat. No. 3,906,155.

Obviously the required change-over by means of relays and/or by purely electronic means can be performed by means of a manually operable key or button. When a television viewer connects a video tape recorder or video disc record to the receiver, he must also press this button. This may be considered as a disadvantage. This disadvantage is increased when the receiver is permanently connected to the video tape recorder or video disc record, for example because the receiver has two input terminals, i.e. one for the reception of transmitter signals and the other for receiving signals from the video tape recorder or video disc record.

It is an object of the present invention to enable such a button to be dispensed with in that changeover can be effected automatically, and for this purpose the television system according to the invention is characterized in that the video storage device includes a circuit arrangement for adding an identification signal to the television signal so that the latter signal is distinguished from a television signal receiver from a transmitter, the television receiver including a circuit for recognizing the identification signal.

It is a recognition of the invention that the most practical and least expensive system in which the television signal includes line synchronizing pulses is characterized in that the identification signal codes the line synchronizing pulses. In this method only a few components are added to the video storage device and existing circuit arrangements in the receiver need be modified slightly only.

In one embodiment the television system according to the invention is characterized in that the interval between the instants at which the leading and trailing edges of each line synchronizing pulse occur two additional edges occur.

The invention also relates to a video storage device which is characterized in that the video storage device includes a circuit arrangement for adding the identification signal to the television signal so that the latter signal is distinguished from the television signal broadcast by a transmitter, and to a television receiver which is characterized in that it includes a circuit arrangement for recognizing the identification signal and for changing over circuits in the receiver.

Figure 2:
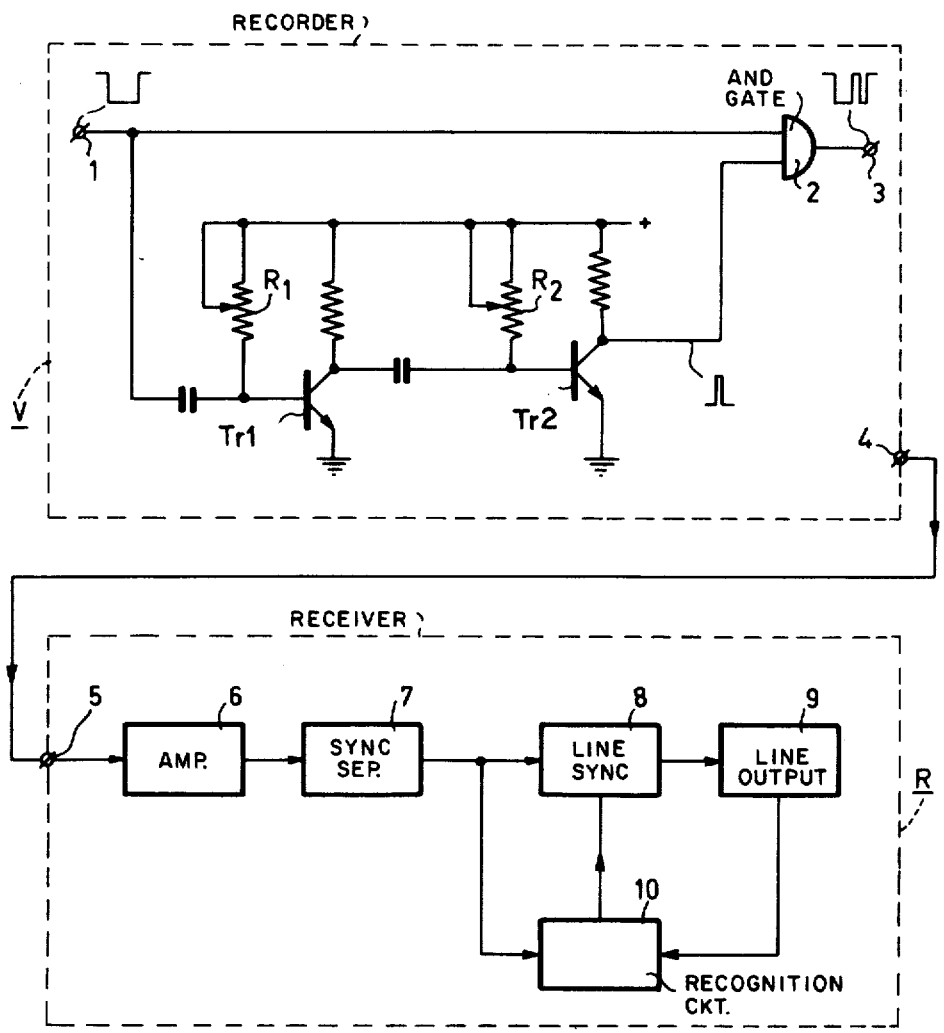
Figure 3:
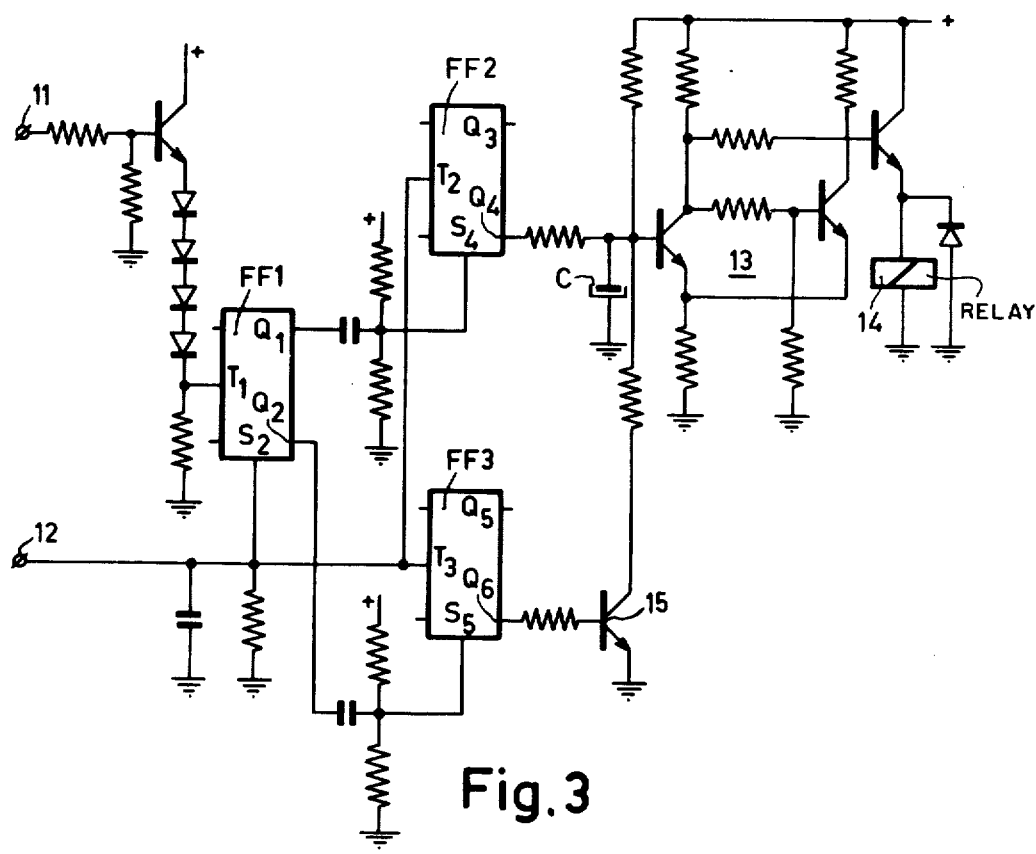
Figure 4:
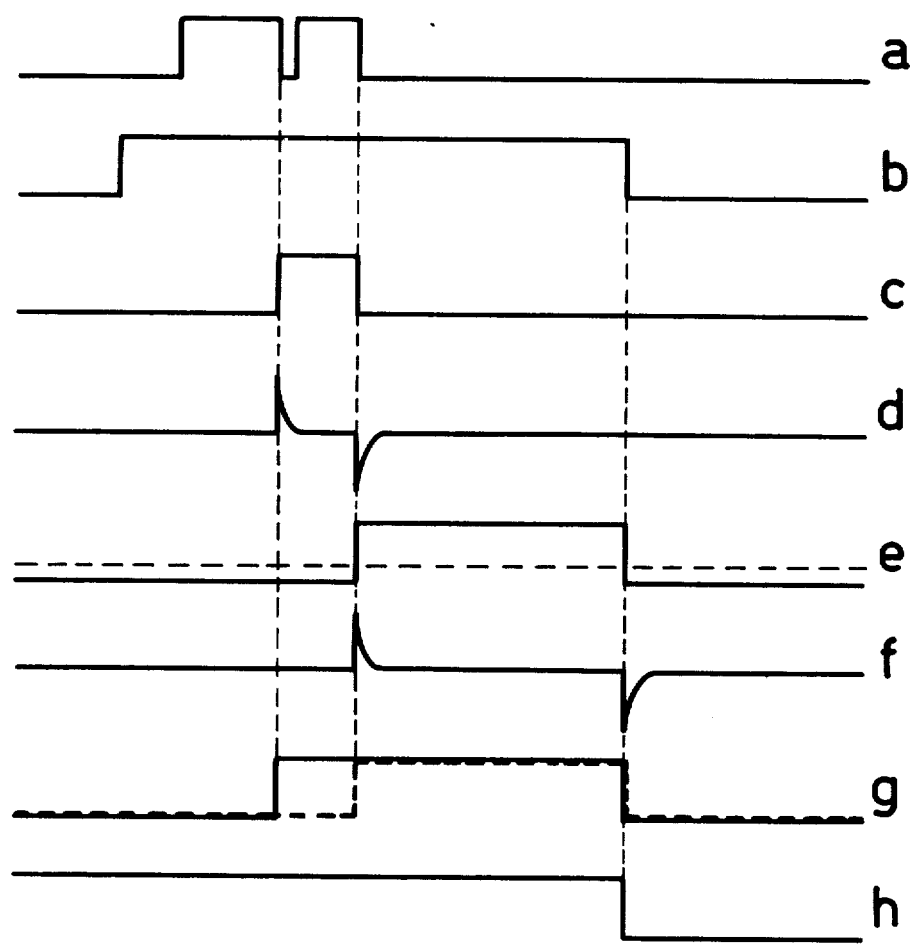

The invention will now be described more fully, by way of example, with reference to the accompanying diagrammatic drawings, in which:

FIG. 1a shows non-coded and FIG. 1b to 1g shows coded line synchronizing pulses, FIG. 2 is a schematic diagram of a video storage device and a television receiver which include circuit arrangements according to the invention, FIG. 3 shows an embodiment of a recognition circuit according to the invention, and FIG. 4 shows waveforms which occur therein.

FIG. 1a shows in idealized form a plurality of line synchronizing pulses as prescribed in a conventional television standard, the symbol T indicating the period, i.e. about 64 $\mu$s according to the European or American standard. Such pulses together with video and audio signals and field synchronizing pulses modulate a carrier which is broadcast by a transmitter, and they are restored in a television receiver after detection and separation from the remaining signals.

FIG. 1b to 1f show line synchronizing pulses which are modified according to the invention and may serve to identify a video tape recorder, a video disc record or the like. The five embodiments shown have the common property that one pulse is provided with an identification signal, the next pulse is not, the third one is, the fourth one is not, etc..

In FIG. b the leading edge of the pulse shown as the first and third pulses occurs after the instants $t_1$ and $t''_2$ respectively prescribed by the television standard. The Figure shows that the time interval $A_1$ between the leading edges of the first and second pulses is shorter than the period T, whilst the time interval $A_2$ between the leading edges of the second and third pulses is longer than T.

In FIG. 1c the trailing edges of the pulses shown as the first and third ones occur before the instants $t_2$ and $t''_2$ respectively prescribed by the television standard. The Figure shows that the time interval $B_1$ between the trailing edges of the first and second pulses is longer than the period T, whilst the time interval $B_2$ between the trailing edge of the second and third pulses is shorter than T.

In FIG. 1d the leading edge of the first pulse occurs after the instant $t_1$ and the trailing edge of the second pulse occurs before the instant $t'_2$ prescribed by the television standard, whilst the leading edge of the third pulse occurs after the instant $t''_1$. The Figure shows that time intervals $A_1$ and $B_1$ are shorter than the period T, whereas time intervals $A_2$ and $B_2$ are longer than T.

In FIG. 1e the first and third pulses are unchanged but the duration of the second pulse is shorter, so that intervals $A_1$ and $B_2$ are longer than the periods T, whereas intervals $A_2$ and $B_1$ are shorter than T.

Obviously further modifications, not shown, are possible, for example a modification of FIG. 1b in which the leading edges of the first and third pulses occur before the instants $t_1$ and $t''_1$ respectively of for example a modification of FIG. 1e in which the duration of the second pulse is longer than that of the pulse in accordance with the television standard.

In FIG. 1f the duration of the pulses is substantially unchanged. However, the first and third pulses have been formed with serrations, i.e. in both pulses two additional edges occur between instants $t_1$ and $t_2$ and between $t''_1$ and $t''_2$ respectively.

The line synchronizing pulses coded in one of the manners described can simply be generated in the video tape recorder. They include a component at a frequency which is one half of the pulse repetition frequency, i.e. about 7.8 kHz. In the receiver the presence of this component can simply be detected, for example by means of a selective network, causing automatic changeover, because the non-coded pulses of FIG. 1a do not contain this component.

In the embodiment shown in FIG. 1g the component is absent. In this embodiment each pulse is formed with a serration as shown in FIG. 1f. FIG. 2 is a simplified circuit diagram of a video tape recorder V to which a television receiver R is connected and in which a simple circuit arrangement for generating the signal of FIG. 1g is built in. A terminal 1 is the output terminal of a pulse generator, not shown, which supplies non-coded negative-going line synchronizing pulses. The pulses are differentiated and their resulting signal is applied to the base of a transistor Tr1. In the absence of signal the transistor Tr1 is saturated and hence it falls out of saturation after the descending edge, i.e. the leading edge, of the pulse applied to terminal 1. At the collector a positive-going pulse is present the duration of which is adjustable by means of the setting of a base resistor $R_1$. This pulse is similarly differentiated and the resulting signal is similarly differentiated and the resulting signal is similarly applied to the base of a transistor Tr2 which is saturated in the absence of this signal. At the collector of the latter transistor a positive-going pulse is produced, the duration of which is adjustable by setting a base resistor $R_2$ and which is added to the pulse at terminal 1 by means of an AND gate 2. At the output terminal 3 of the gate 2 the desired coded pulse is available which is applied to other parts, not shown in FIG. 2, of the video tape recorder V.

Transistor Tr2 falls out of saturation after the descending edge of the pulse applied to the collector of transistor Tr1. Thus the setting of the resistor $R_2$ determines the duration of the serration whilst the instant at which the leadings edge thereof occurs is set by means of resistor $R_1$.

An output terminal 4 of the video tape recorder V is connected to an input terminal 5 of receiver R. The television signal applied to terminal 5 is first amplified and processed in an amplifier part 6. An output signal of the amplifier part controls a synchronization separator 7 at an output terminal of which line synchronizing pulses are available. These pulses are applied to a line synchronizing circuit 8, in which a signal is generated for controlling the line output circuit 9 (for horizontal deflection in the image display tube, not shown) and also to a recognition stage 10.

Because the separator 7 has a limited bandwidth, the duration of the serration in FIG. 1g must be long enough to be transferred by the separator, but not so long that the line synchronizing pulse contains too little information to be suitable for use by circuit 8. In the case of a video tape recorder and a receiver suitable for the television signal according to the European standard, in which the duration of the pulse lies between 4.5 $\mu$s, and 4.9$\mu$s, a duration of the serration between 0.2 $\mu$s and 1 $\mu$s has given good results in practice. A duration of 350 ns was found to be a satisfactory compromise.

It should be mentioned that the serration should not occur symmetrically with respect to the middle instant of the line synchronizing pulse for the following reason. Circuit 8 usually includes a phase discriminator in which the incoming pulses are compared in frequency and/or in phase with the pulses generated in the receiver, the difference being converted into a voltage which controls a line oscillator. Generally the reference voltage produced in the receiver is a sawtooth voltage and in the nominal situation the incoming pulse is symmetrical about the middle of the sawtooth. If the phase discriminator has high sensitivity, the sawtooth is very steep. It will be clear that the serration should not lie at the middle of the pulse, because in this case the phase discriminator would no longer obtain information at and near the nominal condition. It can be shown that the serration may lie closer to the middle of the pulse in proportion as the amplification of the loop for indirect line synchronization is higher.

Recognition stage 10 is required to recognize the coded signal by which circuits, for example a time-constant network associated with the flywheel filter of synchronizing circuit 8, are changed over. It was found that a gate circuit is not suitable for this purpose, because its sensitivity to disturbances is too high, for disturbances may erroneously be regarded as serrations.

FIG. 3 shows an embodiment of recognition stage 10. To an input terminal 11 line synchronizing pulses are supplied by synchronization separator 7 and applied to an input terminal T1 of a flip-flop FF1. To an input terminal 12 line flyback pulses are supplied by an output transformer which forms part of circuit 9. The latter pulses are applied to reset terminal $S_2$ of flip-flop FF1 and to an input terminal T2 of a flip-flop FF2. The flip-flops FF1 and FF2 may, for example, form a dual circuit, for example of the Philips type FJJ261. FIG. 4 shows waveforms which occur in the circuit of FIG. 3, FIG. 4a and FIG. 4b showing the pulses at terminal 11 and terminal 12 respectively.

The two descending edges of the pulse at terminal T1 generate at an output terminal Q1 of flip-flop FF1 a pulse (see FIG. 4c) which is differentiated and then applied to reset terminal S4 of flip-flop FF2 (FIG. 4d). The negative pulse at terminal S4 and the trailing edge of the pulse at terminal T2 cause the flip-flop FF2 to change state so that a pulse as shown in FIG. 4e is produced at an output terminal Q4. This pulse is integrated so that its means value is set up across a capacitor C. This vlaue is shown in FIG. 4e as a broken line. The pulse applied to terminal S2 ensures that flip-flop FF1 is always reset at the end of the flyback pulse.

If the pulse at terminal 11 is not coded, at terminal Q1 a pulse is produced the duration of which extends between the end of the synchronizing pulse and that of the flyback pulse and hence is the same as that of the pulse shown in FIG. 4e. The negative pulse at terminal S4 thus coincides with the end of the flyback pulse (FIG. 4f). Flip-flop FF2 is not reset, the voltage at terminal Q4 remains "high" so that the voltage across capacitor C is much higher than in the case of coding, and hence the first transistor of a Schmitt trigger circuit 13 remains non-conducting. If the incoming pulse at terminal 11 is coded, the said transistor conducts so that a relay 14 is operated and changes over a plurality of circuits in the receiver R. Obviously change-over may alternatively be effected in that an otherwise nonconductive transistor becomes conducting.

The circuit arrangement of FIG. 3 has the advantage that the condition of the relay 14 is the same on reception of coded synchronizing pulses as on reception of coded or non-coded pulses in the out-of-synchronison condition. This is ensured by a flip-flop FF3 to an input terminal T3 of which flyback pulses are applied whilst to its reset terminal 85 differentiated pulses derived from the second output terminal Q2 of flip-flop FF1 are supplied. In the case of coding the polarity of the signal at terminal S5 is the reverse of that of the signal shown in FIG. 4d. At an output terminal Q6 of flip-flop FF3 appears the signal shown by solid lines in FIG. 4g. In the case of non-coding the polarity of the signal at the terminal S5 is the reverse of that of the signal shown in FIG. 4f. In this case the signal shown by broken lines in FIG. 4g appears at terminal Q6. This signal drives the base of a transistor 15 the collector of which is connected through a resistor to capacitor C. In both cases shown in FIG. 4g the ratio of the pulse duration to the entire period is too small to appreciably affect the voltage across the capacitor.

If, however, the pulses at terminals 11 and 12 are not synchronized, i.e. if they do not occur simultaneously, no negative pulse is applied to terminal S5. The voltage at the terminal Q6 changes state to each descending edge of the pulses shown in FIG. 4b (FIG. 4h) so that the said ratio is equal to ½. Because the same applies to flip-flop FF2, now the first transistor of trigger circuit 13 will conduct both when the pulse of FIG. 4a is coded and when it is not coded. This provides the advantage that the time constant of the flywheel filter of synchronizing circuit 8 is short during lock-in, for example after switching from one transmitter to another.

It will be noted that the circuit arrangement of FIG. 3 with the exception of capacitor C and relay 14 can be manufactured in integrated-circuit form in a semiconductor body which can also accommodate circuits 7 and 8. This has substantially no influence on the price of the receiver.

In practice, coding as shown in FIG. 1g has given better results than the codings illustrated in FIGS. 1b to 1f. However, other methods are possible. However, field-frequency identification, for example, is slower and cannot readily be implemented in integrated-circuit form because of the larger time constants. Identification by means of the sound channel as compared with the methods described has the disadvantage of requiring an additional decoder circuit. Hence coding of the line synchronizing pulse is to be preferred.

An advantage of the circuit arrangement according to the invention is the following. If the television receiver is permanently connected to an antenna and to the video storage device and the latter is operative, two television signals are simultaneously received. The circuit 10 by being changed over will automatically block the path of the signal received from the transmitter so that the signal from the storge device alone is processed and displayed. If the storage device is inoperative, the relay is in the condition in which the said path is not blocked, permitting the signal from the transmitter to be displayed.

It should be mentioned that an identification signal for a video storage device must be compatible, which means that a television receiver not provided with recognition circuit suitable for such a signal is capable of normal operation. It has been found that operation of such a receiver is not adversely affected when the line synchronising pulses are coded in the manners described.

What is claimed is:

1. A television receiver for use with both a standard television signal and a recorded television signal from a player that adds an identification signal, said receiver comprising a switchable circuit, means for recognizing said identification signal, and means for switching said switchable circuit in response to said reconizing means when said recognizing means recognizes said identification signal.

2. Television receiver as claimed in claim 1, wherein said switchable circuit comprises a line synchronizing circuit including a flywheel filter having a switchable time constant network, wherein in the presence of the identification signal said switching means switches the time constant network to the same condition as in the case of non-synchronization between received line synchronizing signals and signals generated by a line synchronizing circuit of the receiver.

3. Television receiver as claimed in claim 1, further comprising an input terminal means for receiving said standard televison signal, and an input terminal means for receiving said recorded television signal, wherein the recognizing means prevents display of said standard television signal.

* * * * *